Figures 11A, 11B, 11C:
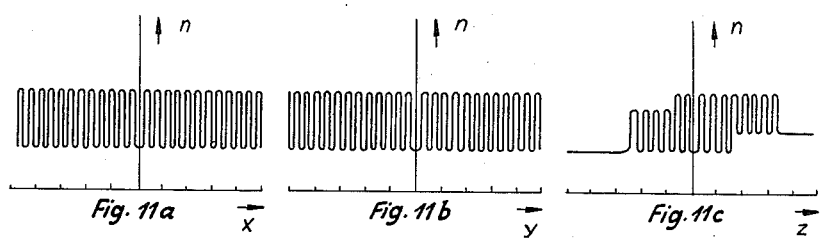

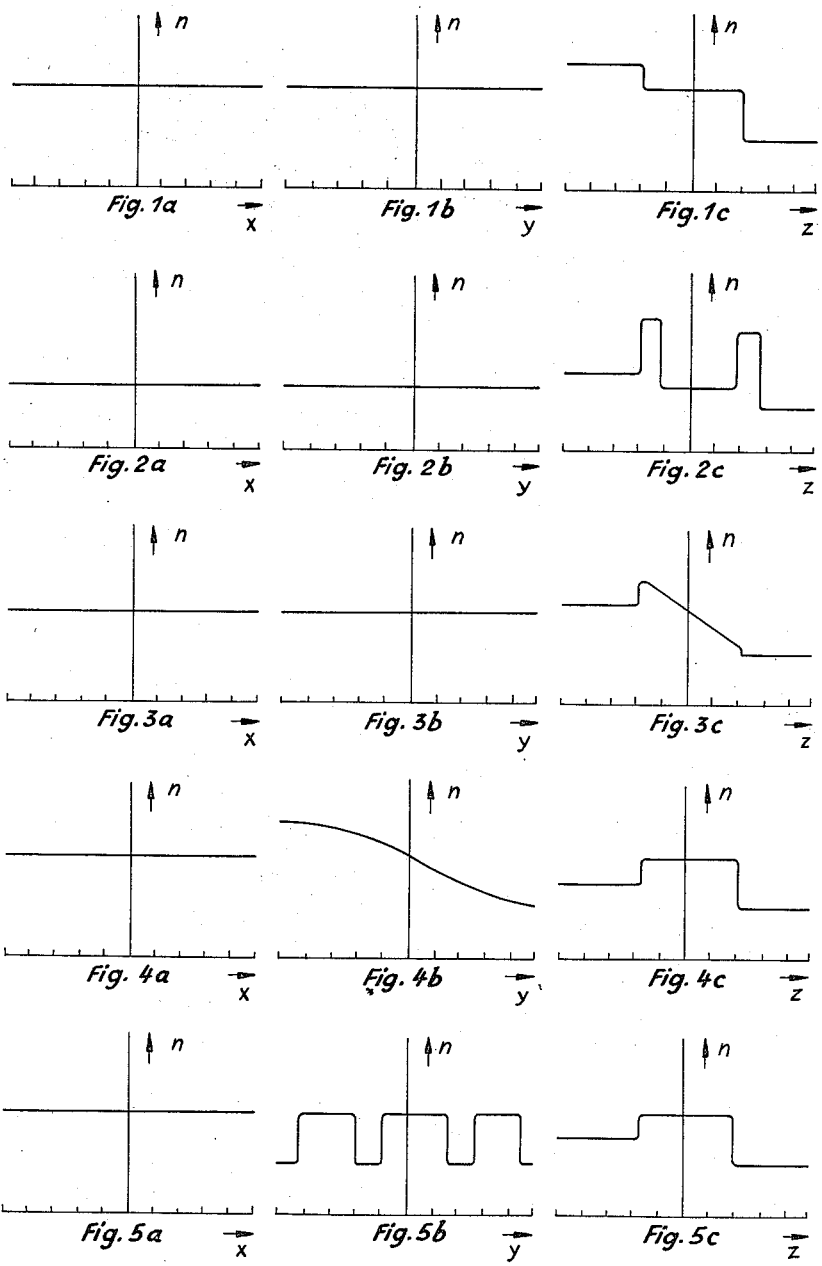

Nov. 25, 1958 T. KRAUS 2,861,896
METHOD OF PRODUCING A COATED OPTICAL FILTER
AND THE RESULTING ARTICLE
Filed Nov. 1, 1954 3 Sheets-Sheet 2
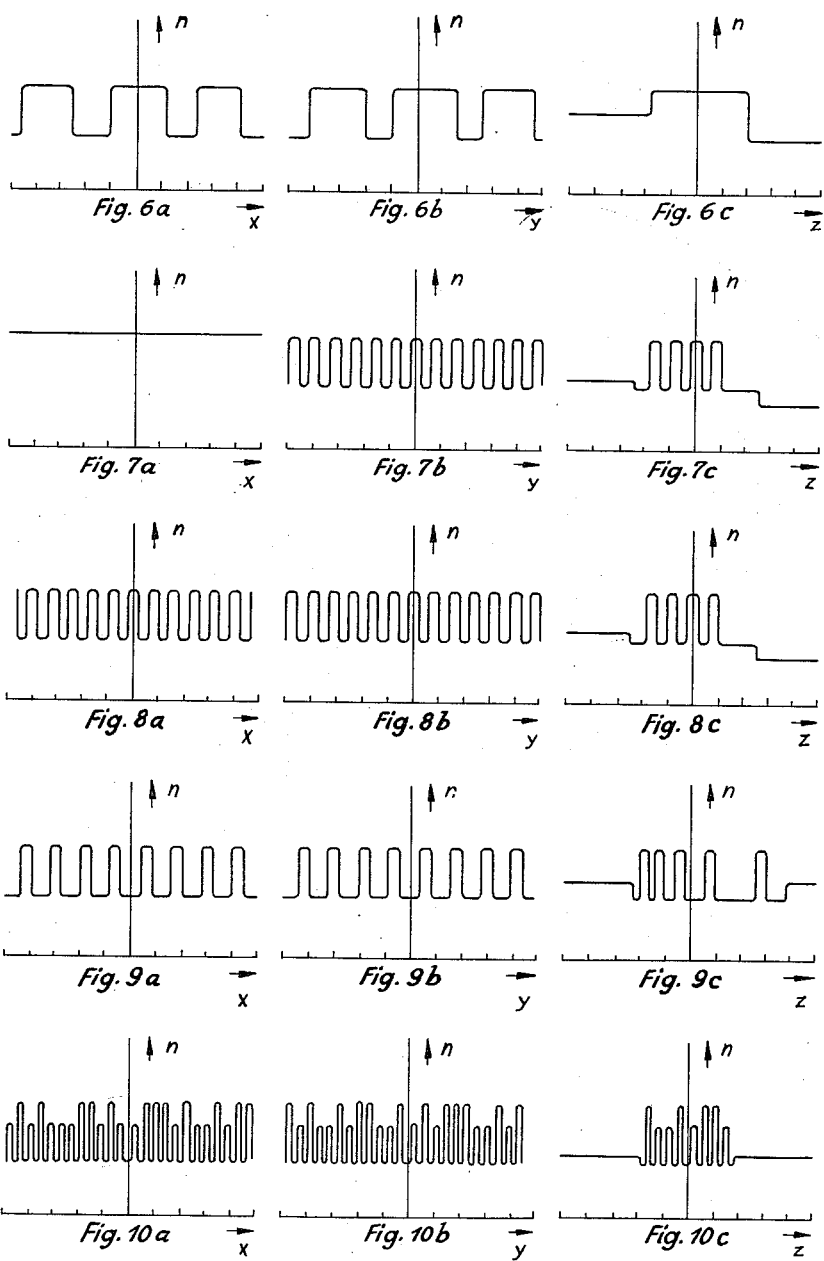
Inventor:
THADDÄUS KRAUS Inventor:
THADDÄUS KRAUS

# United States Patent Office 2,861,896
Patented Nov. 25, 1958

2,861,896

METHOD OF PRODUCING A COATED OPTICAL FILTER AND THE RESULTING ARTICLE

Thaddäus Kraus, Schaan, Liechtenstein, assignor to Geraetebau-Anstalt, Balzers, Liechtenstein Application November 1, 1954, Serial No. 466,161

Claims priority, application Germany October 31, 1953

4 Claims. (Cl. 117—33.3)

This invention relates to thin strata, layers or films for a variety of optical applications and to processes for making such films.

It is an object of the present invention to provide thin films, strata or like layers which are chemically stable and physically durable and are therefore highly desirable and useful for optical purposes.

It is another object of the present invention to provide means facilitating the formation of thin films which are simple in nature, efficient, and easily applied to a surface to be covered thereby.

It is still another object of the present invention to provide means affording the employment of thin films which are inexpensively produceable and adaptable to a great number of operational and decorative uses in scientific and artistic fields.

Yet another object of the present invention is to provide means conducive to the creation of thin films with optical characteristics which lend themselves to the use of such films in single or multiple layers as selective light filters which combine the advantages of filters of the absorption type with the advantages of filters of the interference type.

It is also an object of the present invention to provide means facilitating the manufacture of thin films which requires a minimum of equipment, is inexpensive to carry out, and is easily controllable.

It is a further object of the present invention to provide means enabling the manufacture of thin films in continuous operations which are conducive to the production of such films in single or multiple layers having uniform or non-uniform mechanical and optical characteristics.

The invention more specifically concerns the formation of thin films or like layers which exhibit a colloidal dispersion primary structure.

It is, therefore, an important object of the present invention to provide means enabling the obtainment of optical filtering effects which were not heretofore practically obtainable.

The effect of thin films or strata as light filters has heretofore been based on the following phenomena:

(1) Reflection
(2) Absorption and
(3) Interference

It is characteristic of light filters based on phenomena 1 and 3 that non-transmitted parts of the incident light are subjected to reflection. Although a selective filter effect can be obtained by means of reflection and interference, such effect cannot generally be obtained by means of absorption. This is based on the fact that in view of thin films or strata as opposed to colored glasses, a sufficient absorption of the light can only be obtained by means of so-called highly absorbent materials, i. e., materials the reciprocal of the absorption constant of which is smaller than the wave length of the incident light.

The choice of such materials is limited because they frequently have neither sufficient mechanical nor chemical stability, cannot be uniformly applied as thin layers or films and do not exhibit, especially in the visible range of the spectrum, any sharply defined demarkations of transmission curves. Their absorption spectra are usually continuous, mostly with a decrease of absorption from the ultraviolet to the infrared region. It has not yet been heretofore possible to obtain selective light filters by the use of thin films which cause no, or at least only limited, reflection of non-transmitted light.

In many instances, however, this is exactly what is desired, as for example, in glare protectors or linings for glass for decorative purposes. The present invention aims at the fulfillment of the above-mentioned desirable conditions and characteristics.

The manufacture of heretofore known interference light filters, which are based on the operation or use of thin films and permit the transmission of a definitely limited range or band of wave lengths while the remaining light is reflected, requires a relatively great expenditure of time and labor, because in order to obtain a satisfactory filtering effect (e. g., steepness of slope of the transmission curve at the edges of the transmitted range), it is necessary to employ a greater number of partial layers or films. Such multifilm systems are frequently not very durable and tend to become dissociated from their carrier surface. The number and selection of materials which exhibit, while fulfilling optical conditions, i. e., refraction index, optical path length, etc., sufficient mechanical and chemical stability for use in such multiple film system, is limited.

It is, therefore, another object of the present invention to provide means ensuring a new class of band filters, the manufacture of which is considerably simplified and less expensive than heretofore used multifilm interference filters.

It is still another object of the present invention to provide means contributing to the improvement of band filter structures which often require only a single film formed on the carrier surface in a single operation.

Figure 12:
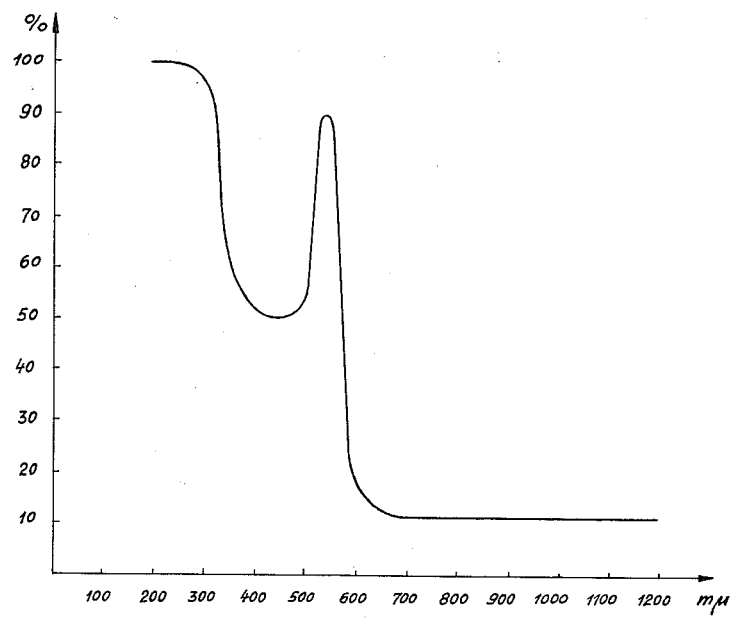

Further objects and advantages of the invention will become more fully evident from the following description when considered in conjunction with the accompanying drawings, in which:

Figs. 1a–1b–1c graphically illustrate, in an orthogonal system, the occurrence of discontinuities of a particular optical property in a thin, homogeneous film;

Figs. 2a–2b–2c to 11a–11b–11c graphically illustrate in a similar manner the occurrence of discontinuities of said optical property in other types of films including films produced according to the present invention; and Fig. 12 is a graph of an extinction spectrum of an optical filter embodying the invention.

In order to more clearly understand the invention the following explanations may be helpful.

In the science of colloids a dispersion system means a system with repeated discontinuities of its physical characteristics in intervals of colloidal dimensions ranging from about 1 to 500 m$\mu$.

Accordingly, thin films for optical purposes, such as to minimize reflection or interference filtering, may be considered as laminar dispersion systems. The discrete structure (discontinuities) of such a system may vary in different directions. In the case of homogeneous thin films, such variation is of course possible only in one direction. This has been made clear in Figs. 1a, 1b, 1c. To this end, an orthogonal coordinate system was set up through an arbitrarily chosen point of a single homogeneous film, and some physical characteristic of magnitude "$n$" of the material, e. g., its index of refraction as a function of position, represented therein; in Fig. 1a for a point on the $x$-axis; in Fig. 1b for a point on the $y$-axis; and in Fig. 1c for a point on the $z$-axis. The units of the abscissa scale are approximately of the magnitude of colloidal dimensions, so that each division equals approximately 5–50 mµ. Along the x- and y-axes (Figs. 1a, 1b) there prevails complete continuity, but along z-axis there appear successive marked discontinuities of the physical property.

Figs. 2a, 2b, 2c illustrate the case of a multiple film consisting of a series of homogeneous layers, as is usually known for use in interference filters. Here again there are a number of discontinuities in the direction of the z-axis, whereas no discontinuities appear in the x- and y-directions.

Figs. 3a, 3b, 3c illustrate the graph of a so-called inhomogeneous film (heretofore referred to as films which evidence some gradient of a physical characteristic, such as index of refraction, in a direction perpendicular to the boundary surface). The denomination "inhomogeneous" might cause confusion when used in connection with the object of this invention, and it is therefore suggested that the term "transition film" be employed, to take into consideration any continuous transition of physical characteristics or properties, as illustrated in Fig. 3d.

In the cases of Figs. 1a to 3c, there were no discontinuities present in two axial directions. Until now it has not been possible to obtain repeated discontinuities of colloidal magnitudes in more than one axial direction, namely, the z-axis (laminar dispersion systems). The macroscopic variations of the physical characteristics obtainable in the x- and y-axes (directions) were characterized, when measured in colloidal terms, by a very nominal slope or change and attained at best a slope as illustrated in Figs. 4a, 4b, 4c.

The invention concerns laminar dispersion systems which in at least one additional axis evidences marked repeated discontinuities in intervals of colloidal dimensions. Such a case is illustrated in Figs. 5a, 5b, 5c.

Fig. 5a illustrates that the intervals between the discontinuities in the direction of one axis can be of greater magnitudes than the magnitudes of colloidal dimensions. This may be referred to as a fibrillar dispersion primary structure of the film or layer or alternatively as a positively directed fibrillar dispersion system with lamellar super- or secondary structure.

It is also possible that discontinuities in colloidal intervals occur in both axial directions parallel to the plane of the film, as is illustrated in Figs. 6a, 6b, 6c. Such a film or layer can then be identified as a layer with total dispersion primary structure and also as total dispersion system with lamellar secondary structure.

The primary structure may have various degrees of dispersion. A film with a high fibrillar dispersion primary structure is illustrated in Figs. 7a, 7b, 7c, and one with a higher total dispersion primary structure in Figs. 8a, 8b, 8c. Figs. 7c and 8c show the discontinuity of the physical characteristics internally of the film in a direction perpendicular to the plane of the film.

Other films made according to the invention demonstrate in at least one axis a gradient of the concentration or size of the colloidal particles of the primary structure, as is shown in Figs. 9a, 9b, 9c in a total dispersion system.

The primary structure can consist, in the case of total or three dimensional dispersions, of particles having spheroidal or elongated or flattened (string or plate) form, the magnitudes of which do not have to be uniform. Furthermore, the partial or total dispersion system may consist of more than two components. Such a system with three components within a thin film is illustrated in Figs. 10a, 10b, 10c.

A lamellar dispersion system with total dispersion primary structure and four components is set forth in Figs. 11a, 11b, 11c. In this example, each of the three films was chosen as a two-component system. Over and above that, this invention also contemplates that any desired combinations of any of the above described types of primary and secondary structures may be had.

The optical effects which can be obtained due to the use of such films or film combinations with total or partial dispersion primary structure, are very varied and not quite clear from the theoretical point of view. These effects occur especially prominently when marked discontinuities in the index of the refraction and the absorption index of the individual components of the dispersion system are present. The type of effect depends on the form and size of the particles. If the degree of dispersion of a primary structure is very high, so that it can be considered as a molecular or atomic dispersion, then the laminar dispersion system evidences the above mentioned characteristics, i. e., reflection, absorption, interference.

Upon decrease of the degree of dispersion, the extinction spectra of such a system show new additional bands which can be explained to be derived from scattering of the incident light. By a choice of suitable combinations of material and selection of degrees of dispersion optical effects resulting from such scattering can be made highly predominant over those emanating from reflection, absorption and interference.

Such dispersion systems are characterized by sharply defined maxima on the extinction spectra. Such a typical extinction spectrum is shown in Fig. 12. In this manner a selective light filter can be built up, for example, such as gives only a minimum of reflection of the light. The fibrillar dispersion systems according to the present invention are dichroistic and can be used as polarizing filters. Such dispersion systems can also be used together with homogeneous thin films, thus additionally making use of their reflection, absorption and interference characteristics, so as to result in special filtering actions.

Special types of electrical effects have also been observed to be present in such systems: relatively high electrical conductivity in the presence of metallic components, electric osmose of the particles internally of the film when under D. C. voltage and temperatures below melting point of the individual components, and directional dependence of the electric resistance of the film in the case of an orderly arranged filbrillar dispersion system.

Also in many chemical respects, such colloidal dispersion systems are different from homogeneous thin films. Thus, in a total dispersion condition metals susceptible of corrosion are protected to a greater degree by corrosion resistant materials than in laminar dispersions. Their chemical behavior in the total dispersion condition is entirely different from their behavior in thin films or in their solid state or compact condition. Completely new applications arise by the use of colloidal dispersion films in view of their chemical composition as compared with those of known solid colloidal dispersion systems, for example, ruby fluor glass, not only qualitatively (that is in the choice of the materials used), but also quantitatively in accordance with the ratio of the amount of dispersed material to the amount of the dispersion agent. For instance, if in the case of ruby fluor glass the quantity ratio of gold to glass is approximately 1:1000, then the ratio of gold to dielectric in the process according to the invention can be 2:1 and more. Such films made according to the invention and when applied to a glass base give the latter the appearance of a brilliant red ruby fluor glass. Because of the extremely fine film thickness, the amount of gold used up is nevertheless a minimum or negligible.

One of the characteristics for heretofore known solid colloidal dispersion systems was that they were always built up with at least one of the materials in its liquid phase. They were until now made only through melting of the component material.

For solid colloids suitable for optical uses, such as ruby fluor glass, the dispersion materials usually employed were viterous masses or materials and the dispersed materials only such as had no undesirable reaction with the glass materials or the material of the melting pot and the surrounding atmosphere under relatively high melting temperatures thereby involved. The number of practically feasible solid colloids was consequently very small.

According to the invention the materials are not united in the liquid phase. One of the main characteristics of the process of the present invention is that at least two of the solid materials employed in building up the laminar dispersion system with fibrillar or total dispersion primary structure or their chemical components are precipitated on the surface from the gaseous phase into which they were transformed by being vaporized under a high vacuum or cathodically atomized either simultaneously or successively, whereby the finally resultant laminar dispersion system with fibrillar or total dispersion primary structure consists of solid materials and at least of two such materials which preferably are very different in their optical characteristics.

It is therefore of considerable importance according to the process of this invention that vaporization of the component materials is achieved. The end product obtained from the condensation may exhibit varying degrees of dispersion depending on whether the component materials were condensed simultaneously or sequentially. Therefore, any number of degrees of dispersion is possible beginning with atomic or molecular dispersion structure to a discrete lamellar dispersion structure up to thin films of a thickness of about 100 m$\mu$. All these structures can be transformed according to the process of the invention by means of a subsequent operation into a total or fibrillar dispersion primary structure.

The degree of dispersion of these end products lies somewhere between these above mentioned limits of the degrees of dispersion of the intermediate products. Thereafter, the subsequent handling can be a condensation (decrease in degree of dispersion), dispersion (increase in degree of dispersion) or a deformation of the structure. It will appear rather difficult that the procedural step of subsequent handling will work in the right direction. It has been surprisingly found, that the structural changes in the solid state resulting by virtue of the process according to the invention, and during the performance of the aforesaid steps are the desired changes to the total or fibrillar dispersion structure. The degree of dispersion required for optical purposes provides a desirable stopping point of the dispersion or condensation process step.

The process according to the invention thus comprises the following steps:

(1) VAPORIZATION

Subject to vaporization are at least two normally solid materials. These do not have to be identical with those embodied or contained in the end product, but must have at least one chemical component in common with the end product. Therefore, the materials to be vaporized can be present as a mixture, but are preferably spacedly divided as unitary substances. The vaporization of these materials can take place either simultaneously or in repeated succession.

The vaporization can be accomplished in two different manners:

(a) *Vaporization under high vacuum*

The vaporization takes place through one or more vaporizing sources. In the latter case, it is preferable that individual regulation of the temperature and speed of vaporization be provided for each vaporizing source.

(b) *Cathodic vaporization*

By variation of the size of the cathode surfaces, the applied voltages, the current intensity, and the temperatures of the cathode surfaces, the speed of vaporization of the individual materials may be regulated.

During the vaporization process chemical reactions may also take place. On the one hand dissociation of the materials being vaporized can take place, and on the other hand reaction of the surrounding gas with said substances under vaporization, for example, oxidation, may occur. Such chemical reactions can be controllably produced as indicated in the examples later referred to, in order to obtain desired materials or material combinations as end products.

(2) CONDENSATION

By means of suitably formed rigid or movable shields and through regulation of the distance between the vaporizing source and the condensation surface and the angle of incidence, the condensation of the vapor streams from the individual vaporizing sources can be directed in any desired manner. Thereby the quantitative ratio of the condensed materials can be held constant or progressively varied during condensation, so that in any particular film the gradient of concentration of the material in any desired direction may be obtained, be it normal to the plane of the film or within the plane of the latter.

The process of the invention can be so carried out that in the case of simultaneous condensation of the materials a possibly very fine dispersed primary structure is attained or in the case of sequential condensation laminar, homogeneous superimposed layers are achieved, which must be subjected to an after treatment or subsequent handling. In some cases, when orderly arranged fibrillar dispersion primary structures are to be obtained, the positioning of the condensation surface at an angle relative to the vapor stream is advantageous. Also during the condensation chemical reactions between the condensed materials or between any of said materials and the surrounding gas can be caused.

(3) A third step often unnecessary for the production of a colloidal dispersion primary structure is the subsequent handling of the condensate which will cause a dispersion, condensation or deformation. This can be performed physically and in some cases chemically.

Among the chemical methods may be listed heterogeneous reactions of at least one of the solid materials used with a material forming a gas at the reaction temperature.

Among the physical steps the following factors require consideration: Temperature, effect of ultraviolet, infrared or visible light rays, X-rays, particle rays and ultrasonic waves.

In the case of temperature treatment the temperatures employed should lie considerably below the melting point of each of the materials being used.

An orderly directed primary structure can be obtained by subjecting the colloidal film during its formation to a unidirectional physical influence, for instance, magnetic field, electric field, temperature gradients, ultrasonic waves, etc.

All of the afore-mentioned additional (subsequent) steps can also be carried out during the condensation (procedural step 2). A solidification of the film and formation of the colloidal structure can be enhanced through the use of suitable solvents, such as water, diluted acid, etc. A subsequent heating of the film is in many instances desirable.

The following two examples will elucidate the process according to the invention:

A. Two solid materials, such as gold and zinc, are simultaneously or sequentially vaporized with or without the presence of oxygen or an oxygen containing atmosphere, under high vacuum onto a carrier surface (step 1). In order to attain a desired film thickness and extinction the condensation is preferably regulated by means of optical devices, for example, through measuring the transmission and reflection characteristic of the applied film during vaporization thereof. The speed of condensation can be regulated by means of shields (step 2).

The film thus obtained does not evidence as yet a colloidal dispersion primary structure. In order to form the latter the carrier surface with the condensate is introduced for approximately ten minutes into oxygen or an oxygen containing atmosphere at a temperature of about 300° C. (step 3). The film which previously was opaque and metallic and glossy is now transformed into a transparent, deep purple or blue film, depending upon the quantitative ratio of the component materials, which film possesses minimum reflecting capacity. The film is characterized by a marked extinction maximum at 550 m$\mu$, almost independent of film thickness and quantity ratio of the components.

The above example of a process according to the invention indicates the formation of a film according to the invention employing steps 1 to 3, in which step 3 includes essentially a heterogeneous chemical reaction.

B. Another typical example embodying the invention is based on a system using magnesium fluoride and copper. In this case the magnesium fluoride ($MgF_2$) and copper (Cu) are simultaneously vaporized under a high vacuum (step 1). If the condensation (step 2) is accompanied by a sufficient removal of heat, then a molecular dispersion film is formed which appears green. If such film is now tempered at a temperature of about 300° C. (step 3) then it assumes an intensive reddish purple color. It is interesting that despite the presence of oxygen, no oxidation of the copper takes place. The condensation can be so controlled that in the direction normal to the carrier surface, the copper concentration is decreased and that by suitable film thickness, a strong decrease of reflection can be obtained. If this condensation takes place at high temperatures, then the reddish purple color of the film is obtained immediately, so that no subsequent treatment as in step 3 is required.

Ordinarily the choice of the initial or starting materials to be used will be determined by the end product which is desired to be obtained, with a view to chemical reactions taking place during steps 1, 2 and 3. It has been shown to be advantageous that the material components of the end product be characterized as follows:

(1) At least two component materials should present strong differences in their optical characteristics.

(2) At least one of the materials should have a high degree of hardness.

(3) At least one of the materials should possibly be corrosion resistant.

(4) At least one of the materials should have a melting point below 700° C.

(5) At least two materials should be mutually insoluble or relatively insoluble.

Accordingly, the end product should preferably contain at least one metal and an inorganic substance, such as a dielectric, capable of forming a light-transmitting layer. Chemical changes of the condensate will be prevented, if the after treatment (step 3) takes place in a vacuum or inert gas. Such chemical changes will result when the treatment according to step 3 takes place in a material which is gaseous at the reaction temperature and if at least one of the materials of the condensate is capable of reacting therewith.

Films according to the invention have the most varied applications. Glare preventers which do not reflect light and linings for decorative purposes have already been mentioned. For decorative applications interesting variations may be obtained, especially when visible light or corpuscular rays are employed in connection with suitable optical devices, such as shields, in order to control the transformation of the film into its colloidal dispersion condition. Furthermore, designs can be produced due to the fact that certain parts of the film can be transformed to the colloidal condition to a greater extent than others and some spots might not be transformed at all.

Further applications for such films are light filters for scientific and industrial purposes. A "ruby film" according to the invention possesses, for example, an extinction curve as shown in Fig. 12, from which it is evident that such films are very suitable for use as light filters.

Thus, without complicated multiple film systems a filter has been produced which completely surpasses previously known interference-type filters as to their durability. A further advantage is that the maximum wave length of the light transmitted through such filters is not altered or distorted upon change of the angle of incidence, which is a well known defect of interference-type filters. The light filter according to the invention thus combines on the one hand the advantages of the absorption filters, namely independence of the direction of incident light with the advantage of the interference filters, namely, steep edges in the transmission spectrum.

Fibrillar dispersion systems have the property of being able to polarize light; therefore systems according to the invention can be employed as polarization filters.

Of course, it is possible to combine films according to the invention having colloidal structure with homogeneous transformation layers as they have heretofore been used for reducing reflection and thus to use interference, reflection and absorption phenomena.

In retrospect, therefore, it can be seen that the invention relates to thin films having predetermined optical characteristics due to a specific colloidal dispersion structure which may be a fibrillar or a total dispersion primary structure, and to processes for manufacturing such films which comprise the steps of vaporizing at least two normally solid materials to bring the latter into their respective gaseous phases, depositing said vaporized materials onto a supporting body to form a single thin, homogeneous film thereon, subjecting said homogeneous film to an external treatment, and controlling said treatment of said homogeneous film in a predetermined manner to thereby transform said homogeneous film into a film having a colloidal dispersion structure of predetermined optical characteristics, whereby said colloidal dispersion film may serve as an optical band filter upon transformation of said homogeneous film in a uniform manner resulting in predetermined optical characteristics which are uniform throughout said colloidal dispersion film, and, respectively, as a decorative coating upon transformation of said homogeneous film in a non-uniform manner resulting in predetermined optical characteristics which are non-uniform throughout said colloidal dispersion film.

The treatment above referred to may constitute an application of radiant energy, such as light (visible, infrared, or ultraviolet), heat, supersonic waves, magnetic and electric fields, etc., which treatment may be performed in the presence of gases chemically inert or reactive with respect to the component materials of the film.

The specific apparatus employed in carrying out the procedures as set forth above is fairly conventional, and may preferably be as follows. Having reference especially to example B, the apparatus consists essentially of a crucible made of a suitable material, such as tungsten, into which the magnesium fluoride is placed, and an evacuated housing. The crucible is mounted in the housing and connected into a suitable electric heating circuit, for example. A suitable clamping arrangement is provided to suspend the glass plate which is to serve as the carrier surface for the film above the crucible in the housing.

In operation, the crucible is heated to a high temperature, such as 800° C., which will cause vaporization of the magnesium fluoride. The molecules of magnesium fluoride thus liberated from the solid material are, of course, dispersed in all directions, and those which hit or impinge on the glass plate adhere thereto.

Simultaneously, in a similar manner, copper is vaporized at a temperature of approximately 1000° C. The copper atoms fly toward the glass plate and adhere thereto. Thus, there is formed on the plate a homogeneous mixture of copper and magnesium fluoride particles.

When this deposited film (condensate) is very thin, approximately 500 mµ, it appears greenish in color.

The glass plate is now removed from the vacuum housing and placed into an oven at a temperature of about 300° C. After about an hour the previously greenish color of the film is transformed to an intensive reddish-purple.

Theoretically, this result can be explained on the ground that at first a homogeneous dispersion of copper in magnesium fluoride was produced in which the particles were of atomic or molecular sizes. These particles then began to be joined, and subsequently somewhat larger particles having a mean diameter of approximately 100 A. resulted. These larger particles, which are usually called colloidal particles, scatter and extinguish all green and yellow light, permitting only a transmission of reddish-purple light. This is substantially illustrated by Fig. 12, which shows that, apart from ultraviolet light below 350 mµ, the extinction is a maximum for yellow-green light at 550 mµ and a minimum for red at 700–800 mµ and partially for blue at 450 mµ. The resulting mixture is a reddish-purple color.

In lieu of a crucible, as above set forth, a cathode constituted by the material to be vaporized may be employed. Such a cathode is subjected to a high potential of approximately 15,000 volts which causes the atoms or molecules of the material to be thrown off from the surface of the cathode to be deposited on the first obstruction they meet, i. e., the glass plate. This phenomenon is commonly known as "cathode sputtering" or "cathodic atomization." The second electrode in such a system could, for instance, be the housing itself.

It is also apparent that if the filter structure is constituted by more than one layer of films produced as set forth above, the conditions of discontinuity of the physical property involved, such as index of refraction, can be multiplied or modified to any desired degree to produce any required optical effect. Thus, the multiple discontinuity conditions illustrated in Figs. 10a, 10b, 10c, and 11a, 11b, 11c can be produced by virtue of the fact that incident light will meet different obstruction patterns in each of the three orthogonal directions or axes selected as the reference frame in each layer of the film.

It is to be noted that other materials besides gold, copper, and magnesium fluoride may be employed in carrying out this invention. Thus, among materials which may be found useful may be listed thorium, silver, and zinc oxide. It is to be understood, however, that the invention is not limited to the use of these materials exclusively.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. The method of producing a transparent layer formation with colored light transmission on a glass carrier base; comprising the steps of depositing on said base at least two different substances from the vapor phase, said substances being deposited in the form of a thin, finely mixed, greenish colored layer, one of said substances being magnesium fluoride and the other of said substances being copper, and then heating said base until the greenish color of the said layer is changed to a reddish purple color, thereby attaining a colloidal dispersion of copper in magnesium fluoride.

2. A method of producing a transparent layer formation on a transparent base for use as an optical filter comprising the steps of vaporizing magnesium fluoride and copper, depositing said vaporized magnesium fluoride and copper onto the base to form a single, thin, green colored homogeneous film thereon, and then subjecting said homogeneous film to a heat treatment at about 300° C. for about an hour to effect transformation of said homogeneous film to a film of reddish purple color comprising a colloidal dispersion structure of copper in magnesium fluoride.

3. A method of coating a base with a layer formation for optical uses; comprising the steps of vaporizing magnesium fluoride at a temperature of about 800° C., simultaneously vaporizing copper at a temperature of about 1000° C., condensing the vaporized magnesium fluoride and simultaneously condensing the vaporized copper on a base to obtain a homogeneous film formation on said base of green color, and then subjecting said homogeneous film to a heat treatment at about 300° C., for about an hour in the presence of oxygen to effect transformation of said homogeneous film to a film of reddish purple color comprising a colloidal dispersion structure of copper in magnesium fluoride.

4. An optical band filter prepared in accordance with the method set forth in claim 1.

References Cited in the file of this patent

UNITED STATES PATENTS

| | | |
|---|---|---|
| 1,176,313 | Pfund | Mar. 21, 1916 |
| 1,982,774 | Winkler et al. | Dec. 4, 1934 |
| 1,994,483 | Ott | Mar. 19, 1935 |
| 2,239,452 | Williams et al. | Apr. 22, 1941 |
| 2,382,432 | McManus et al. | Aug. 14, 1945 |
| 2,456,241 | Axler et al. | Dec. 14, 1948 |